3,432,487
PROCESS FOR EXTRACTION AND CONCENTRA-
TION OF HYDROPHILIC SUBSTANCES
Gilbert V. Levin, Chevy Chase, Md., assignor to E. I. du
Pont de Nemours and Company, a corporation of
Delaware
No Drawing. Filed May 16, 1966, Ser. No. 550,103
U.S. Cl. 260—211.5
Int. Cl. C07d 51/50; B01d 11/00
9 Claims

ABSTRACT OF THE DISCLOSURE

Detecting certain hydrophilic substances, e.g., the nucleotide adenosine triphosphate, can be used to determine the presence of living organisms. However, these substances must first be extracted from the organisms and concentrated. A process for extracting and concentrating the following hydrophilic substances; nucleotides, nucleosides, flavins, water soluble vitamins and water soluble cofactors involves mixing a material containing such substance with water and one of the following organic liquid extractants: ketones, alcohols, aldehydes, esters, nitroparaffins and phenols; and separating and recovering the aqueous phase containing the hydrophilic substance.

---

This invention relates to a process for obtaining aqueous extracts of various hydrophilic substances from biological or nonbiological materials in a manner which also provides any desired concentrations of these extracted substances in the aqueous solutions obtained.

A more specific aspect of this invention relates to a process for obtaining aqueous extracts and for concentrating aqueous solutions of biological hydrophilic substances, such as nucleotides (e.g., adenosine triphosphate, hereinafter referred to as ATP) nucleosides, flavins, water soluble vitamins, and water soluble cofactors.

Hydrophilic substances are frequently present in a material in combination with various water insoluble substances. The water insoluble substances may be linked to or sequester the hydrophilic substances so as to render them relatively inaccessible for aqueous extraction. For example, ATP is present in biological cells in which membrane and other material prevent its quantitive extraction by water alone.

ATP is a nucleotide which is present in all living organisms. By determining whether there is ATP present in a certain environment, it is possible to detect the existence of living organisms in that environment. Thus, by monitoring for the presence of ATP, the existence of microorganisms may be determined. This determination is useful in the detection of biological warfare agents; in the determination of background levels of microorganisms in the environment such as air, water, food, clean assembly areas, hospital rooms and germ free areas, and the detection of any increased contamination in any of these environments; and in monitoring the effectiveness of sterilization procedures and the sterilization of compounds and apparatus. Further, the determination of ATP is useful for the study of cell aggregates, for example tissues of higher animals.

One method for determining the presence of ATP is by means of the phenomenon of firefly bioluminescence, i.e., by the reaction of ATP with firefly lantern extract. In practicing this method, a sample of the environment to be tested or assayed for living organisms, such as an aqueous extract of the material which is suspected to contain living organisms, is mixed in the presence of oxygen with firefly lantern extract. If a biological material is present in the sample, this fact will be indicated by the emission of light. The amount of bioluminescent light which is emitted is directly proportional to the amount of ATP present in the material being tested. However, since the ATP is, to some extent, sequestered by or linked to other substances, the total ATP is not available quantitatively in an extracellular free state for reaction in the firefly bioluminescent assay.

In testing for the presence of biological material, since the amount of bioluminescent light which is emitted is directly proportional to the amount of intracellular ATP in the material tested, it is desirable to bring about as high a degree of release of the ATP contained within the material suspected of containing biological material as possible.

ATP is the primary energy donor for all metabolic processes and is also useful, in and of itself, in biochemical research, in inhibiting enzymatic browning of potatoes and as a pharmacological agent. However, the extraction of ATP from biological material is difficult.

One method by which ATP has been extracted from biological material involves treating finely comminuted cells with a water soluble agent such as ethyl alcohol, discarding the alcohol and subsequently extracting the ATP from the residual cell material into water. However, this procedure is inconvenient since it must be performed in a plurality of separate steps and, moreover, since it does not provide a convenient means for concentrating ATP in the aqueous phase.

It is an object of this invention to provide a process for obtaining aqueous extracts of any desired concentration of various hydrophilic substances from biological or nonbiological materials.

It is a further object of this invention to provide a process for obtaining aqueous extracts of ATP from biological material.

It is another object of this invention to provide a process for concentrating an aqueous solution of ATP.

It is a still further object of this invention to recover substantially quantitatively the ATP contained in biological cells to make it available to participate in a firefly bioluminescent assay reaction.

These and other objects are attained by the practice of this invention which, briefly, comprises preparing an admixture of a material containing a hydrophilic substance, water and an organic liquid extractant which will liberate the hydrophilic substance from the material in which it is contained. The water in the admixture may be initially present (e.g., when the material containing the hydrophilic substance is in the form of an aqueous preparation), or the water may be added at the time the admixture is prepared. The organic liquid extractant is chosen so that a portion of the water in the admixture will be dissolved in the extractant. The extractant is used in an amount sufficient to dissolve part but not all of the water. There is thereby formed a separate aqueous phase in a quantity less than that originally present in the admixture. This aqueous phase contains dissolved therein the hydrophilic material which has been released from the substance in which it was originally contained. The aqueous phase may then be separated from the organic liquid phase and recovered. The aqueous phase may be used as such (e.g., aqueous extracts of ATP may be assayed as hereinafter described) or the hydrophilic material may be recovered therefrom such as by evaporation of the water.

The practice of this invention may be used to extract water soluble, hydrophilic substances from a material containing the same using an appropriate organic liquid extractant which is not completely miscible with water and which will act to liberate the hydrophilic substance from the material. Such organic liquid extractants include compounds such as ketones, alcohols, aldehydes, esters, nitroparaffins, phenols or derivatives of any of such compounds which are substituted with groups such as fluorine, chlorine or phenyl. In a preferred embodiment of this invention, the process is employed to extract biological hydrophilic substances, such as nucleotides, nucleosides, flavins, water soluble vitamins or water soluble cofactors, from materials containing such substances.

Thus, by the practice of this invention, aqueous extracts of the following may be obtained: low molecular weight organic compounds such as acetic acid from petroleum using an ester such as ethyl acetate as the liquid extractant; water soluble pesticides such as 2,4-dichlorophenoxyacetic acid from soil using a nitroparaffin such as nitroethane; inorganic compounds such as sodium iodide from dimethylsulfoxide using an alcohol such as 1-butanol; nucleotides such as ATP from tissue cells using 1-butanol; nucleosides such as adenosine from reaction products resulting from the synthesis of the same, using an aldehyde such as butyraldehyde as the extractant; flavins such as riboflavin from spinach using an alcohol such as 5-fluoro-1-pentanol; water soluble vitamins such as ascorbic acid from citrus using phenol; and water soluble cofactors such as coenzyme A from egg yolk using a ketone such as 3-pentanone.

This invention will be further described with specific reference to the extraction of ATP from a biological material.

The biological material from which ATP may be extracted and concentrated may be obtained from tissues taken from a living or recently living animal, from a bacterial or viral culture, suspensions of microorganisms, blood, urine, water or beverages suspected of contamination, tissue cells, patient exudates, air suspected of containing microorganisms, food or other contaminated environments.

Organic liquids which may be used as extractants include, for example, monohydric alcohols containing from four to seven carbon atoms. These are well known compounds and include 1-butanol, 2-butanol, t-butyl alcohol, n-amyl alcohol, t-amyl alcohol, 3-pentanol, etc. 1-butanol is the preferred alcohol and is advantageously used in an amount sufficient to give a water:alcohol ratio of from about 1:1 to 1:5.

The method of preparing the admixture of sample material containing (or suspected to contain) biological material, the alcohol and water is not critical. Thus, the sample material may be added to a mixture of the alcohol and water or it may be added first to one of these components and then the other component added. It is generally preferred that an aqueous suspension of the sample material first be prepared and that the alcohol be added to this suspension.

Where the number of cells per test volume of the sample and, consequently the amount of ATP, is below the limit of detectability, a preferred method of operation is to filter an adequate volume of an aqueous suspension of the cells through a suitable filter, such as a membrane filter of the submicron size. The filter, together with the material retained on it, is then placed into an appropriate container to which an appropriate quantity of the organic liquid extractant is added. The mixture is shaken and then allowed to stand for from one to several minutes. Sufficient water is then added and mixed with the organic liquid to saturate the latter and create the desired volume of aqueous phase. The mixture may then be centrifuged if further phase separation is desired. The ATP will now be in the aqueous phase. Aliquots of the aqueous phase can be removed by syringe or other means and used for assay in the firefly bioluminescent reaction. Thus, the cells contained in relatively large volumes of suspension can be collected, extracted, and the ATP concentrated for assay.

The relative amounts of organic liquid extractant and water used in the practice of this invention are important. Sufficient organic liquid is used to bring about the release of the ATP contained in the cells and sufficient water is used to provide the desired volume of aqueous phase in which is carried the ATP released from the cells. If it is desired to obtain more concentrated solutions of ATP, lesser amounts of water and greater amounts of organic liquid, both within the operable limits, are used.

The organic liquid extractant in the admixture apparently dissolves lipids or other materials in the cell membranes, thereby making them permeable to the ATP contained in the cells. The ATP is then extracted almost completely into the aqueous phase. Moreover, the organic liquid reduces the volume of the aqueous phase by dissolving a portion of the water but not the ATP. Thus, by appropriate adjustment of the amount of organic liquid used, the desired concentration of ATP in the aqueous phase can be achieved.

The separation of the aqueous phase from the organic liquid phase occurs when the admixture is allowed to stand for a short period of time. However, if it is desired to speed up the separation, this may be accomplished by centrifuging the admixture.

By the practice of this invention, the ATP content of biological material may be recovered substantially quantitatively so that it is available for participation in the light-producing response of the firefly bioluminescent reaction. This invention also provides a mechanism for concentrating the ATP to increase the sensitivity of the overall assay method.

The aqueous extract may be assayed by means of the firefly bioluminescent technique by contacting an aliquot of the extract in the presence of oxygen with firefly lantern extract, which extract contains luciferin, luciferase and magnesium, and monitoring for the emission of light. The aqueous reaction medium will generally contain enough oxygen to allow the bioluminescent reaction to take place. The amount of light emitted may be measured to determine the amount of ATP present. This provides a measure of the number of cells present.

The firefly bioluminescent reaction may be carried out utilizing crude firefly lantern extracts or the purified constituents therefrom which participate in the bioluminescent reaction. A sufficiently high degree of sensitivity may be attained using the primary extract of the firefly lantern. Lyophilized firefly lantern extract may be obtained commercially. This material may be prepared for use by dissolving it in distilled, deionized water to the desired concentrations. The extracts used in the examples which follow, are obtained by dissolving 70 mg. of lyophilized firefly lantern extract in 5 ml. of water. The lyophilized preparation also contains $MgSO_4$ and potassium arsenate in amounts sufficient to result in concentrations of 0.01 M and 0.05 M, respectively. The pH of such a solution is 7.4. The solutions may be further diluted to give any desired concentration of a firefly lantern extract. The firefly lantern extract which may be used may also be prepared in the laboratory from desiccated firefly tails. The firefly tails are first ground to a fine powder with a mortar and pestle with a small amount of washed silica. The powder is then extracted with 0.05 M potassium arsenate-0.01 M $MgSO_4$ at pH 7.4.

In order to observe and record small amounts of light produced by a positive response between the material to be assayed and the firefly lantern extract and to make quantitative measurements of the amount of light emitted, instruments which will sense and record the intensity of the emitted light may used. In order to detect and record the intensity of emitted light, one procedure consists of injecting the aqueous extract prepared in accordance with the practice of this invention into a cuvette containing the firefly lantern extract. The extract is held at pH 7.4 with potassium arsenate buffer. The light emitted as the result of the reaction between any ATP in the aqueous extract and the firefly lantern extract strikes the photosensitive surface of a photomultiplier tube giving rise to an electric potential which can be measured and recorded by either an oscilloscope photograph or a chart recorder.

A convenient unit for measuring the response produced by the instrument is the millivolt.

Because the response (i.e., light emission) is almost instantaneous when the aqueous extract containing ATP is contacted with the firefly lantern extract, the firefly lantern extract should be positioned in front of the light detection system prior to the introduction of the material to be assayed. The bioluminescent response with ATP is determined by measuring the maximum intensity of the emitted light, which after reaching this maximum value, decays logarithmically. With all other factors constant, the maximum intensity is directly proportional to the concentration of ATP.

The instrumentation necessary for the quantitative measurement of bioluminescence consists of a photomultiplier tube for the conversion of light energy into an electrical signal, a device for determining the magnitude of the signal, and a light-tight chamber for presentation of the bioluminescent reaction to the photomultiplier tube.

In one system, part of the assembly consists of a composite sensing and reaction chamber which contains a photomultiplier tube, with appropriate circuitry, and a rotary cylinder mounted in a block of aluminum in a manner which permits removal of the reaction chamber without exposing the phototube to light. A section of the cylinder wall is cut out to accommodate a standard rectangular cuvette. Immediately above the cuvette holder is a small injection port sealed with a replaceable light-tight rubber plug. The entire unit is painted black to reduce light reflection. The photomultiplier converts the light energy into an electrical signal. An oscilloscope, which records the magnitude of the signal from the photomultiplier, is provided with an adjustable vertical deflection scale which will allow an adjustment in system sensitivity. There is a multiple switching arrangement at the oscilloscope input which makes it convenient to adjust the system zeros and balances. The differential input to the oscilloscope provides a means to balance the dark current output of the phototube. The response to the firefly luminescent system displayed on the oscilloscope screen is recorded with a camera which mounts directly onto the front of the oscilloscope. To observe and record the reaction, the cuvette containing the necessary reagents is positioned in the cuvette carrier without exposing the phototube. Rotation of the carrier positions the cuvette in front of the phototube. The extract presumed to contain ATP is then added through the injection port and the magnitude of the response, if any, is recorded by the camera.

The procedure for assaying aqueous extracts prepared according to the practice of this invention utilizing electronic apparatus to detect and record the intensity of the bioluminescent reaction, which procedure is employed in the examples, is described below:

One tenth ml. of a 0.5% buffered aqueous solution of commercially available lyophilized firefly lantern extract is placed into a cuvette which is then positioned in a light detection chamber. The extract contains luciferase, luciferin and magnesium. Sufficient dissolved oxygen for the bioluminescent reaction is present in the solution. Ten microliters of the aqueous extract to be assayed are then drawn into a hypodermic syringe and immediately injected through the light-proof seal into the cuvette. The reaction reaches maximum light intensity in less than one second and then decreases logarithmically for several minutes. The entire procedure can be executed and the response through its maximum amplitude recorded in less than 2 minutes.

In order to make quantitative determinations of the amount of ATP present, the instrument used to measure the light response may be calibrated using known concentrations of ATP. A calibration may be plotted by injecting 1/100 ml. portions of known concentrations of ATP through the light-proof seal into the cuvette by means of a hypodermic syringe. The light response in millivolts is plotted against the ATP concentration. A straight linear function is obtained. For example, if the response from $10^{-1}$ gamma of ATP is 20,000 millivolts, that from $10^{-2}$ is 2,000 millivolts, etc.

The following examples illustrate the best modes contemplated for carrying out this invention:

EXAMPLES 1 TO 3

A culture of *Escherichia coli* is incubated for 24 hours. To 1 ml. portions of the resultant aqueous suspension of bacterial cells are added the amounts of anhydrous 1-butanol set forth in Table 1. The mixtures are shaken for 1 minute and centrifuged in a clinical centrifuge for one minute to separate the aqueous phase from the butanol phase. Ten microliters from both the butanol and the aqueous phases of each example are assayed for ATP content as previously described and the results are set forth in Table 1.

TABLE 1

| Example | Amount butanol (ml.) | Response (mv.) Aqueous phase | Response (mv.) Butanol phase |
|---|---|---|---|
| 1 | 2 | 1,220 | No response. |
| 2 | 3 | 1,900 | Do. |
| 3 | 4 | 2,700 | Do. |

Upon the addition of approximately 5 or more ml. of butanol, no aqueous phase remains.

EXAMPLE 4

A 24-hour culture of *Escherichia coli* is prepared. To a 1 ml. portion of the culture, there are added 4 ml. of anhydrous 1-butanol. The mixture is shaken for 1 minute and allowed to stand for 15 minutes to separate the aqueous phase from the butanol phase. A 10 microliter portion is assayed for ATP content as previously described. A response of 2,600 mv. is obtained.

By way of contrast, another 1 ml. portion of the culture is admixed with 4 ml. of distilled water; the mixture is subjected to ultrasonic oscillation for 1 minute (another means used for releasing ATP content from cells) and a 10 microliter portion of the mixture is assayed for ATP. A response of only 46 mv. is obtained.

EXAMPLE 5

This example illustrates the advantage of using anhydrous 1-butanol.

To a 1 ml. portion of a 24-hour culture of *Escherichia coli*, there is added a 4 ml. portion of 1-butanol which is saturated with respect to water. To another 1 ml. portion of the same culture, there is added a 4 ml. portion of anhydrous 1-butanol. The two mixtures are shaken for 1 minute and then centrifuged to separate the aqueous phase from the alcohol phase. Three 10 microliter aliquots from each aqueous phase are assayed for ATP content as previously described. The results are set forth in Table 2.

TABLE 2

Response (mv.) of aqueous extracts taken from mixture with:

| | | | |
|---|---|---|---|
| Water saturated butanol | 180 | 170 | 180 |
| Anhydrous butanol | 960 | 1,080 | 1,000 |

EXAMPLES 6 TO 8

A 24-hour culture of *Escherichia coli* is suspended in distilled water to give approximately $1.3 \times 10^7$ cells/ml. In each example, a 10 ml. portion of the cell suspension is filtered through a membrane filter having a diameter of 1 inch and a pore size of 0.45 micron. Each filter is then immersed in 1 ml. of anhydrous 1-butanol, shaken for 1 minute and then the amounts of water indicated in Table 3 are added. The mixture is again shaken and centrifuged for 1 minute and the aqueous phase is recovered. The volume of the aqueous phase obtained in each example is set forth in Table 3. A 10 microliter aliquot of the aqueous phase obtained in each example is assayed for ATP as previously described. The results are set forth in Table 3.

TABLE 3

| Example | Vol. water added to butanol extract (ml.) | Vol. of resulting aqueous phase (ml.) | Response (mv.) |
|---|---|---|---|
| 6 | 0.25 | 0.10 | 4,800 |
| 7 | 0.20 | 0.04 | 10,200 |
| 8 | 0.20 | 0.04 | 9,600 |

EXAMPLES 9 TO 17

These examples illustrate the variety of alcohols which may be used as the organic liquid extractant. A 24-hour culture of *Escherichia coli* is suspended in distilled water to give approximately $2.4 \times 10^8$ cells/ml. In each example, a 10-ml. portion of the cell suspension is filtered through a membrane filter having a diameter of one inch and a pore size of 0.3 micron. Each filter is then immersed in 5 ml. of one of the anhydrous alcohols listed in Table 4, shaken for one minute and sufficient water added to give an aqueous phase of 0.1 ml. Each mixture is again shaken and centrifuged for one minute and the aqueous phase is recovered. A 10-microliter aliquot of the aqueous phase obtained in each example is assayed for ATP as previously described. The results are set forth and compared in Table 4.

TABLE 4

| Example No. | Alcohol | Response (mv.) aqueous phase |
|---|---|---|
| 9 | 1-butanol | 7,500 |
| 10 | 2-methyl-1-propanol | 3,000 |
| 11 | 1-pentanol | 2,900 |
| 12 | 3-pentanol | 3,200 |
| 13 | 2-methyl-1-butanol | 6,600 |
| 14 | 3-methyl-2-butanol | 1,900 |
| 15 | 1-hexanol | 5,800 |
| 16 | 1,1-dimethyl-1-propanol | 3,900 |
| 17 | 1-heptanol | 3,300 |

Although the invention has been described with particular reference to certain preferred embodiments thereof, variations and modifications can be effected within the spirit and scope of the invention as described hereinbefore and as defined in the appended claims. Thus, substantially pure ATP may be obtained from the aqueous extract of ATP prepared in accordance with this invention by precipitating the ATP from solution according to known techniques.

I claim:

1. A process for obtaining an aqueous extract of a hydrophilic substance selected from the group consisting of nucleotides, nucleosides, flavins, water soluble vitamins and water soluble cofactors from a material containing and binding or sequestering said hydrophilic substance which comprises preparing an admixture of said material, water and an organic liquid extractant selected from the group consisting of ketones, alcohols, aldehydes, esters, nitroparaffins and phenols which will liberate said hydrophilic substance from said material, said water being partially soluble in said extractant, said extractant being present in an amount sufficient to dissolve any desired part but not all of said water so that there are formed as separate phases an aqueous phase containing said hydrophilic substance dissolved and concentrated therein to the extent desired and an organic liquid extractant phase, thereafter separating said aqueous phase from said extractant phase and recovering said aqueous phase.

2. A process as defined in claim 1 wherein said hydrophilic substance is adenosine triphosphate.

3. A process as defined in claim 2 wherein said organic liquid extractant is an alcohol.

4. A process as defined in claim 1 wherein said organic liquid extractant is admixed with an aqueous suspension of said material.

5. A process for obtaining an aqueous extract of adenosine triphosphate from biological material which comprises admixing a sample containing said material, a monohydric alcohol containing from four to seven carbon atoms and water, said alcohol being present in an amount sufficient to dissolve part but not all of said water so that there are formed as separate phases an aqueous phase containing said adenosine triphosphate dissolved therein and an alcohol phase, thereafter separating said aqueous phase from said alcohol phase and recovering said aqueous phase.

6. A process according to claim 5 wherein said alcohol is anhydrous 1-butanol.

7. A process according to claim 5 wherein said alcohol is admixed with an aqueous suspension of said material.

8. A process according to claim 5 wherein an aqueous suspension of said material is filtered, the filter cake is suspended in said alcohol and water is added to form said admixture.

9. A process according to claim 6 wherein the volume of water associated with said sample is, or is adjusted to a range of ratios of from about 1:1 to 1:5 with respect to the volume of 1-butanol employed.

References Cited

UNITED STATES PATENTS 2,516,080  7/1950  Sobin et al. _____ 260—236.5

LEWIS GOTTS, *Primary Examiner.*

J. R. BROWN, *Assistant Examiner.*

U.S. Cl. X.R.

260—211.3, 343.7